(12) United States Patent
Affaticati et al.

(10) Patent No.: US 6,644,347 B2
(45) Date of Patent: Nov. 11, 2003

(54) POSITION DETECTOR, PARTICULARLY FOR ELECTRICAL VALVE ACTUATORS

(75) Inventors: Archimede Affaticati, Fiorenzuola d'Arda (IT); Giordano Alfieri, Parma (IT)

(73) Assignee: Biffi Italia S.r.l. (IT)

( * ) Notice: Subject to any disclaimer, the term of this patent is extended or adjusted under 35 U.S.C. 154(b) by 0 days.

(21) Appl. No.: 10/106,129

(22) Filed: Mar. 15, 2002

(65) Prior Publication Data

US 2002/0134437 A1 Sep. 26, 2002

(30) Foreign Application Priority Data

Mar. 25, 2001  (IT) ...................................... PR2001A0025

(51) Int. Cl.[7] .............................................. F16K 37/00
(52) U.S. Cl. ...................................... 137/554; 251/304
(58) Field of Search .............................. 137/554; 251/304

(56) References Cited

U.S. PATENT DOCUMENTS

| | | | | | |
|---|---|---|---|---|---|
| 3,347,262 | A | * | 10/1967 | Gibson | 137/375 |
| 3,742,340 | A | * | 6/1973 | Kiedrowski | 323/348 |
| 5,099,867 | A | * | 3/1992 | Emery | 137/1 |
| 6,283,150 | B2 | * | 9/2001 | Apel et al. | 137/554 |

\* cited by examiner

*Primary Examiner*—A. Michael Chambers
(74) *Attorney, Agent, or Firm*—Shlesinger, Fitzsimmons & Shlesinger

(57) ABSTRACT

Position detector (1), particularly for electrical valve actuators, comprising a disk (2) fixedly connected to an actuator and provided with a mapping defining a reference for detecting the actuator displacement; and means for detecting the actuator displacement by said mapping. Said mapping is formed by a plurality of permanent magnets operatively arranged along the disk (2) circumference, the polarity of each magnet being opposed to the polarity of two immediately adjacent magnets.

4 Claims, 1 Drawing Sheet

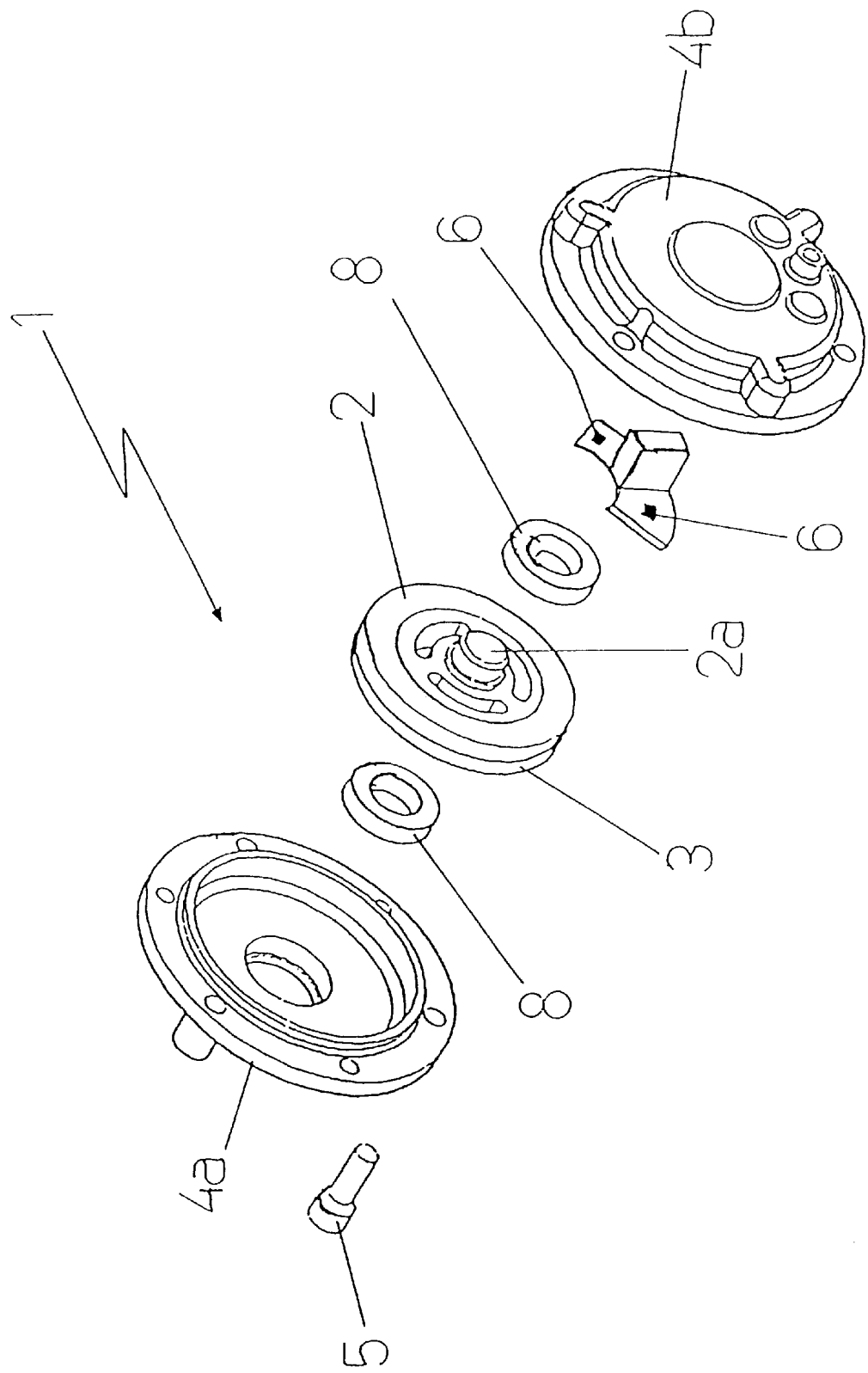

POSITION DETECTOR, PARTICULARLY FOR ELECTRICAL VALVE ACTUATORS

This invention refers to a position detector, particularly for electrical valve actuators comprising the features set forth in the precharacterizing part of claim 1.

As it is known, electrical-type valve actuators are widely used in many technical fields and are particularly used in plants for conveying and treating fluids, such as oil and gas pipelines, and particularly in plants for conveying liquids and vapors.

The actuators in said plants are generally operated by an electrical motor to adjust the openings and closings of valves throttling the fluid flow.

In order to make precise the adjustments of said valves, it is necessary to control and check the movement and location of the actuators by position detectors.

Presently, a first known approach for detecting the actuator movement and location consists of optical means typically comprising a perforated disk fixedly connected to the actuator; that disk acts substantially as a shutter that, when it rotates with the actuator, covers and uncovers a light source, usually a light emitting diode (LED) aligned with the disk holes and facing the front disk surface.

Photodetector means located on the back disk surface are capable of detecting the light signal issued by said source and transformed into discrete pulses by the shutter.

The detected pulses are fed to a computer that counts them determining the angular displacement the disk and consequently the absolute detector position when it is known the starting angular position.

A second approach for detecting the actuator displacement consists of potentiometers linked to the actuator.

A third approach consists of electromechanical devices such as microswitches.

The above outlined position detectors have the following drawbacks.

Particularly, referring to the first approach, the optical means are power-consuming and requires a power supply. Moreover in order to "remember" the actuator position the light source must be permanently supplied. This disadvantage is particularly acute because the light source must be always supplied by a cumbersome auxiliary battery even though the plant using the actuator is not operating.

Disadvantageously the prior position detectors cannot be used in any environmental conditions because they are negatively susceptible to thermal shocks consequently they operate only in a narrow temperature range.

Another disadvantage is due to the fact that some of the abovementioned position actuators must be initially reset so they can correctly measure the actuator displacement and consequently its position.

The object of the present invention is to overcome the abovementioned disadvantages by means of a position detector, particularly for electrical actuators, having a low consumption and that can be supplied by an ordinary battery commercially available in case of main power failure.

Another object of the present invention is a position detector, particularly for electrical valve actuators that can be used in a wide temperature range and consequently in varying environmental conditions.

Another object of the present invention is to embody a position detector that avoids the initial resetting and that is capable of determining the actuator rotation in both directions.

Another object of the present invention is a position detector that is inexpensive and can be easily manufactured.

Said objects are fully met by the position detector, particularly for electrical valve actuators, that is the subject matter of the present invention that is characterized by the attached claims.

These and other objects are set forth by way of a non limitative example in the following description of a preferred embodiment illustrated in the attached drawing wherein the single FIGURE shows an exploded view of a position detector, particularly for electrical valve actuators according to the present invention.

Referring to the FIGURE, the position detector, particularly for valve electrical actuators, is generally shown by number 1.

Detector 1 comprises a disk 2 fixedly connected to the actuator and provided with a mapping defining a reference system capable of detecting the displacement of disk 2 and therefore the displacement of the actuator.

Specifically, said mapping is embodied by a plurality of permanent magnets arranged along the disk circumference so that each magnet having a predetermined polarity is located between two magnets having opposite polarity.

In the embodiment shown, disk 2 is obtained by sintering and permanent magnets are obtained by magnetizing said disk. More particularly, disk 2 is divided by said magnetization in a plurality of sectors so that each sector having a predetermined polarity is located between two sectors having opposite polarity. In the preferred embodiment, said sectors are adjacent to one another and have the same dimensions.

A throughhole 2a is defined in disk 2 to connect the latter to the actuator. The disk 2 is received in a protective housing and is fitted to a disk holder usually made of an aluminium alloy. In the example shown, that housing is made up by two flanges 4a, 4b connected by two or more screws 5.

Detector 1 is provided with means for detecting the actuator displacement by said mapping. In the example shown, said means comprises at least a pair of magnetically operating switches 6 confronting the permanent magnets on disk 2. Specifically, said switches 6 are spaced apart by 90° electrical degree along the disk circumference and are arranged so that one of the switches is located on the center line of a sector and the other is located on the boundary line between two sectors. Switches 6 are supported by a board (not shown) and they are switched by magnetic fields having opposed polarity, in this way the two switches never switch simultaneously so that disk 2 can detect the actuator direction of rotation.

Detector 1 is provided with a pair of ball bearings 8 rotatably supporting disk 2.

The operation of the invention 1 is as follows.

Two switches 6 are alternatively switched by the rotation of disk 2. In particular, their switchings produce voltage changes detectable by a specific device (not shown because it is already known). The number of switchings, that is calculated by means of a computer linked to the detector, enables to know the displacement and angular position of the actuator. Moreover, since switches 6 do not operate simultaneously and are spaced apart, it is possible to know the direction of rotation of disk 2 and consequently of the actuator.

The invention attains the following advantages.

First of all the mapping of the permanent magnets requires a very low energy to store the detected data.

Secondly, the mapping of the permanent magnets makes the detector less susceptible to thermal shocks so that said detector can be used under different environmental conditions. Particularly, the detector, as in the example shown, can correctly operate in a temperature range from −40° C. to +85° C.

Advantageously, the position detector according to the invention does not require any initial resetting, and since switches are spaced apart, it can determine the actuator direction of rotation.

Another advantage arises from the fact the actuator is inexpensive and can be easily manufactured.

What is claimed is:

1. A rotatable position detector (1), particularly for electrical valve actuators, comprising:

a disk (2) fixedly connected to a rotating valve actuator for rotation thereby and provided with a maping defining a references for detecting the actuator displacement; and means for detecting actuator displacement by said mapping, characterized by the fact that said mapping comprises a plurality of permanent magnets secured to the end operatively arranged along the disk (2) adjacent the circumference thereof the polarity of each magnet being opposed to the polarity of two immediately adjacent magnets thereof.

2. Detector according to claim 1 characterized by the fact said means for detecting the actuator displacement comprises at least two magnetically operable switches (6) confronting the permanent magnets on disk (2).

3. Detector according to claim 2, characterized by the fact said switches (6) are spaced apart by 90° electrical degrees along the circumference of said disk (2).

4. Detector according to claim 1, characterized by the fact said permanent magnets are contiguous to each other and are of the same size.

* * * * *